(12) United States Patent
Simpson

(10) Patent No.: US 9,884,967 B1
(45) Date of Patent: Feb. 6, 2018

(54) NON-STICK MARINE COATING

(71) Applicant: Timothy Simpson, Pacifica, CA (US)

(72) Inventor: Timothy Simpson, Pacifica, CA (US)

(73) Assignee: Earthcoat Technologies Inc., Novato, CA (US)

( * ) Notice: Subject to any disclaimer, the term of this patent is extended or adjusted under 35 U.S.C. 154(b) by 0 days.

(21) Appl. No.: 15/264,233

(22) Filed: Sep. 13, 2016

Related U.S. Application Data

(60) Provisional application No. 62/218,524, filed on Sep. 14, 2015.

(51) Int. Cl.
| | | |
|---|---|---|
| *B05D 5/00* | (2006.01) | |
| *B05D 3/00* | (2006.01) | |
| *C09D 5/16* | (2006.01) | |
| *C09D 5/08* | (2006.01) | |
| *C09D 5/14* | (2006.01) | |
| *C08K 5/01* | (2006.01) | |
| *C08K 11/00* | (2006.01) | |

(52) U.S. Cl.
CPC .............. *C09D 5/1625* (2013.01); *C09D 5/08* (2013.01); *C09D 5/14* (2013.01); *C09D 5/1681* (2013.01); *C09D 5/1687* (2013.01); *C08K 5/01* (2013.01); *C08K 11/00* (2013.01)

(58) Field of Classification Search
None
See application file for complete search history.

(56) References Cited

U.S. PATENT DOCUMENTS

| | | | | |
|---|---|---|---|---|
| 3,066,151 A | * | 11/1962 | Dimler, Jr. ........... | C07D 303/16 524/114 |
| 3,210,318 A | * | 10/1965 | Dolce .................. | C08K 5/1515 523/456 |
| 3,489,541 A | * | 1/1970 | Steinberg ............... | B24D 18/00 51/295 |
| 3,527,720 A | * | 9/1970 | Groff ..................... | C08G 59/42 528/111.5 |
| 6,386,679 B1 | * | 5/2002 | Yang ......................... | B41J 2/03 347/45 |
| 2009/0197003 A1 | * | 8/2009 | Shira .................... | C09D 5/1637 427/386 |

* cited by examiner

*Primary Examiner* — Peter A Salamon
(74) *Attorney, Agent, or Firm* — Thomas Van Zandt

(57) ABSTRACT

Methods and formulations for nonstick marine coatings and compounds are disclosed. Embodiments of the invention provide nonstick marine coatings and compounds that include an adhesion reduction component that is sufficiently homogenous and sufficiently non-viscous to be incorporated into one or more other components of the coating compound.

3 Claims, No Drawings

NON-STICK MARINE COATING

FIELD

Embodiments of the invention relate generally to the field of non-stick coatings, which are coatings formulated to reduce the ability of other materials to adhere to the coating, and include non-stick marine coatings having anticorrosion properties.

BACKGROUND

Conventional marine coatings have several disadvantages. One such disadvantage is that conventional coatings typically contain components that are toxic to marine life and humans. This is particularly problematic where there is significant interaction between human development and sensitive wildlife areas. Conventional solutions have attempted to substitute one or more toxic components with non-toxic or less toxic components. Conventional coatings still include one or more environmentally problematic or toxic components. One conventional coating formulation incorporates barium metaborate as a bactericide and fungicide as well as a marine organism irritant. However, barium metaborate, while less toxic than many other anti-corrosives, is considered a hazardous material in production and application. The exotoxicity of barium metaborate is a disadvantage of such a conventional coating formulation.

Another aspect of such a conventional coating formulation is an attempt to reduce the ability of marine organisms to adhere to the coating by incorporating an adhesion reduction component that is non-toxic and biodegradable. However, the adhesion reduction component of such a conventional coating formulation is too viscous and not sufficiently homogenous. The adhesion reduction component cannot adhere to other components of the coating and does not provide non-stick properties as intended.

DETAILED DESCRIPTION

Embodiments of the invention provide nonstick marine coatings compounds and methods that have significantly reduced ecological impact compared with prior art formulations. For one embodiment of the invention a coating does not contain copper or other compounds such as barium metaborate that are toxic to marine life. For one embodiment of the invention, bactericidal and fungicidal components such as glyceryl monooleate are used as well as other bacteria-control and anti-sliming components. Such components may contain as active ingredients 1,3-Propanediamine, N-(3-aminopropyl)-N-dodecyl to effect bacteria control. Such components, while not toxic, adequately deter bacteria and fungus. Therefore, nonstick marine coating compounds can be made significantly less ecologically harmful.

Embodiments of the invention also provide an adhesion reduction component that is sufficiently homogeneous and sufficiently non-viscous to allow for adequate dispersal and incorporation of the adherence reduction component into other components of the coating. Additionally, or alternatively, nonstick marine coating compounds can be made significantly less ecologically harmful by replacing the typically harmful coating-adhesion components (e.g., copper, zinc, tin, etc.) with a one or more non-toxic (or significantly less toxic) components that provide substantially similar properties and results.

In accordance with one embodiment of the invention an epoxy resin in combination with other components forms a nonstick marine coating compound. In some such embodiments the coating is produced in multiple stages. For one embodiment, one or more component layers are applied to a surface and allowed to partially cure. A subsequent coating, containing an adhesion-reduction component is then applied. The two or more coating and optionally intermediate or subsequent coatings blend during a curing process. The resulting coating adheres adequately to the surface while providing a non-stick surface.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, components, structures, or characteristics may be combined in any suitable manner in one or more embodiments.

Moreover, inventive aspects lie in less than all features of a single disclosed embodiment. Thus, any claims following the Detailed Description are hereby expressly incorporated into this Detailed Description, with each claim standing on its own as a separate embodiment of this invention.

Embodiments of the invention are applicable in a variety of settings in which nonstick marine compounds, coatings, paints, or sealants are used. Such applications include, but are not limited to ships, onshore and offshore, structures, recreational marine vehicles and other objects subject similar fouling.

The following is list of example components that may be used in conjunction one with another to produce an improved nonstick marine coating compound. Also described is some of the ways in which these components function within a nonstick marine coating compound.

For one embodiment of the invention, EPON 828, which is a hexion two-part bisphenol-A-(epichlorhydrin) product is used to provide a nonstick marine coating, compound adhesion, mechanical strength, as well as dielectric and chemical resisting properties.

In accordance with one embodiment of the invention, a di-functional glycidyl ether (e.g., Cardolite NC 514) is used as an epoxy resin which allows flexibility and can be used to reduce brittleness. It also has organism-irritant properties.

In accordance with one embodiment of the invention, a glycidyl ether (e.g., Lite 2513 HP) of cashew nutshell liquid combined with epichlorohydrin is used to form a modifier that improves flow and leveling and can significantly reduce pinholes, "fish eyes", craters, and orange peeling. It can also improve adhesion by increasing substrate wetting. It has the added benefit of improving pigment dispersion. It also has organism-irritant properties.

In accordance with one embodiment of the invention, alumina-silica ceramic fibers are used as a strengthener, that is, a functional additive to provide wear resistance, reinforcement, compressive strength, and corrosion resistance. For one embodiment, the alumina-silica ceramic fibers may be ball-milled (e.g., 734-000000). Titanium dioxide may also be used as such a strengthener.

In accordance with one embodiment of the invention, an ethyl acrylate (e.g., Modaflow) is used as a modifier to improve flow and leveling. It can significantly reduce pinholes, "fish eyes", craters, and orange peeling. It can also improve adhesion by increasing substrate wetting. It has the added benefit of improving pigment dispersion. It is contained in a resin and is only slightly soluble in water. It also has organism-irritant properties.

In accordance with one embodiment of the invention, an alumina-silica clay is used to thicken the nonstick marine coating compound and reduce the settling of other components.

In accordance with one embodiment of the invention, some relatively more toxic antibacterial and antifungal components such as barium metaborate, which is a component of some prior art formulations, will be replaced with relatively less toxic components. In one embodiment of the invention, one or both of compounds comprising glyceryl monooleate or F1,3-Propanediamine, N-(3-aminopropyl)-N-dodecyl are used. Such components offer broad spectrum activity against bacteria, algae and viruses, as well as broad compatibility with all classes of surfactants.

In accordance with one embodiment of the invention, silica (SIL-CO-SIL #53), which is a crystalline silica is used as a suspending agent, and to provide abrasion and mar resistance. It also aids flattening, improves tear strength, adhesion, and tensile strength. It also improves heat-resistance without appreciably reducing flexibility.

In accordance with one embodiment of the invention, alkylated phenolic polymide (Lite 2002), which is a phenalkamine epoxy curing agent is used to enhance adhesion. It can significantly improve adhesion over prior art formulations in cold damp conditions over poorly prepared surfaces. It is insoluble in water, moisture tolerant during cure cycle and increases corrosion resistance. It also has organism-irritant properties.

Fortegra 100 is a low viscosity epoxy toughening agent that remains independent of cross-linking materials. It is used in the amount of 3-8% to volume of cross-linking polymers.

Disparlon F-9050 is a preactivated blend of polyamide and polyolefin used to reduce surface skinning and to form a strong network structure to prevent settling of fillers and pigments. It is used in the amount of 1.5-3.0% to volume weight.

For alternative embodiments, various types of pigments may be added to the formulation depending on application and preferences.

Degras is an unctuous substance obtained from sheep. It is used as an adherence reduction component. Degras provides a hard waxy finish that reduces adhesion of organisms. It is used in the amount of approximately 10% to volume weight. As noted above, for one embodiment, the degras is kept separate from the topcoat mixture until a final mixing process. Di'limonene is a biodegradable solvent derived from orange peels. It is used to dilute the degras to a blendable consistency and to reduce overall viscosity. It is used in the amount of at least 35% to volume of degras. In contrast to prior art formulations in which the Di'limonene was used at no higher than 15% to volume of degras, the increased amount of Di'limonene relative to such prior art formulations sufficiently reduces viscosity and provides a more homogeneous compound. This allows for adequate dispersal and incorporation of the adherence reduction component into other components of the coating which may occur during a curing process.

For one embodiment, a nonstick marine coating includes a primer component, a cure component, and an adherence reduction component. In accordance with various embodiments, the adherence reduction component comprises degras in an amount of approximately 10% to volume weight and di'limonene in an amount of at least 35% to volume of degras. For one such formulation the primer component comprises approximately 58-59% of the coating, the cure component comprises approximately 30-31% of the coating, and the adherence reduction component comprises approximately 10-12% of the coating. One exemplary formulation is as follows:

Primer component: Epoxy 36%, epoxy diluent 4%, defoamer 0.5%, surfactant 0.25%, bactericidal component 2%, diluent 6.25%, flex epoxy 2.5%, epoxy toughener 6%, and anti-settling agent 0.75%.

Cure component: Hardener 26%, defomaer 0.5%, surfactant 0.25%, anti-settling agent 2%, strengthener 0.75%, and pigment 0.25%.

Adherence reduction component: degras 8.5% and di'limonene 3.5%.

Other formulations in accordance with embodiments of the invention are possible as noted below.

General Matters

Embodiments of the invention provide nonstick marine coatings, compounds and methods. Specific example formulations for such coatings and compounds in accordance with one embodiment of the invention are included as an Appendix. Many variations of such formulations are possible and such variations may be preferable in the context of particular applications, available components, cost to manufacture and other considerations.

Embodiments of the invention are not limited to the particular formulations provided as examples. Therefore, though embodiments may be described as including various components of various amounts, it should be understood that the components can be substituted with others providing similar described properties and the amounts can be varied within the ranges provided depending on a variety of factors including particular applications.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A nonstick marine coating comprising:
A primer component;
a cure component; and
an adherence reduction component, the adherence reduction component including degras and di'limonene, the degras in an amount of approximately 10% by volume of the nonstick marine coating, and the di'limonene in an amount of at least 35% by volume of degras.

2. The nonstick marine coating of claim 1, wherein the primer component comprises: epoxy, epoxy diluent, defoamer, surfactant, bactericidal component, diluent, flex epoxy, epoxy toughener, and an anti-settling agent.

3. The nonstick coating of claim 1, wherein the cure component comprises: hardener, defoamer, surfactant, anti-settling agent, strengthener, and pigment.

* * * * *